(12) United States Patent
Kuntze et al.

(10) Patent No.: US 10,913,335 B2
(45) Date of Patent: Feb. 9, 2021

(54) COMPOSITE LIFTGATE

(71) Applicant: Magna Exteriors Inc., Concord (CA)

(72) Inventors: Christopher J. Kuntze, Goodrich, MI (US); Stephen R. Roddy, Harrison Township, MI (US); Eric R. Langley, Howell, MI (US)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 16/502,525

(22) Filed: Jul. 3, 2019

(65) Prior Publication Data

US 2019/0329636 A1 Oct. 31, 2019

Related U.S. Application Data

(63) Continuation of application No. 15/234,735, filed on Aug. 11, 2016, now Pat. No. 10,384,520, which is a continuation-in-part of application No. PCT/US2015/015413, filed on Feb. 11, 2015.

(60) Provisional application No. 61/938,452, filed on Feb. 11, 2014.

(51) Int. Cl.
*B60J 5/10* (2006.01)
*B62D 29/04* (2006.01)

(52) U.S. Cl.
CPC .............. *B60J 5/107* (2013.01); *B60J 5/101* (2013.01); *B62D 29/043* (2013.01)

(58) Field of Classification Search
CPC .......... B60J 5/107; B60J 5/101; B62D 29/043
USPC .................................................. 296/146.8, 76
See application file for complete search history.

(56) References Cited

U.S. PATENT DOCUMENTS

| 6,929,309 | B1* | 8/2005 | Radu | B60R 13/0243 |
| | | | | 296/146.7 |
| 8,894,128 | B2* | 11/2014 | Barral | B60J 5/107 |
| | | | | 296/146.6 |
| 2011/0074179 | A1* | 3/2011 | Kuntze | B60J 5/107 |
| | | | | 296/146.6 |
| 2012/0248814 | A1* | 10/2012 | Tsukiyama | B60J 5/101 |
| | | | | 296/146.8 |

* cited by examiner

*Primary Examiner* — Joseph D. Pape
(74) *Attorney, Agent, or Firm* — Warn Partners, P.C.

(57) ABSTRACT

A composite liftgate system with an inner panel construction having a strengthening channel structure. Structural composite reinforcements are bonded to the inner panel where additional strength is needed to meet predetermined performance requirements. Where the extra structure is needed, no steel or a minimum amounts of steel is used and the structural reinforcements are bonded in place using adhesive prior to application of additional fasteners.

25 Claims, 9 Drawing Sheets

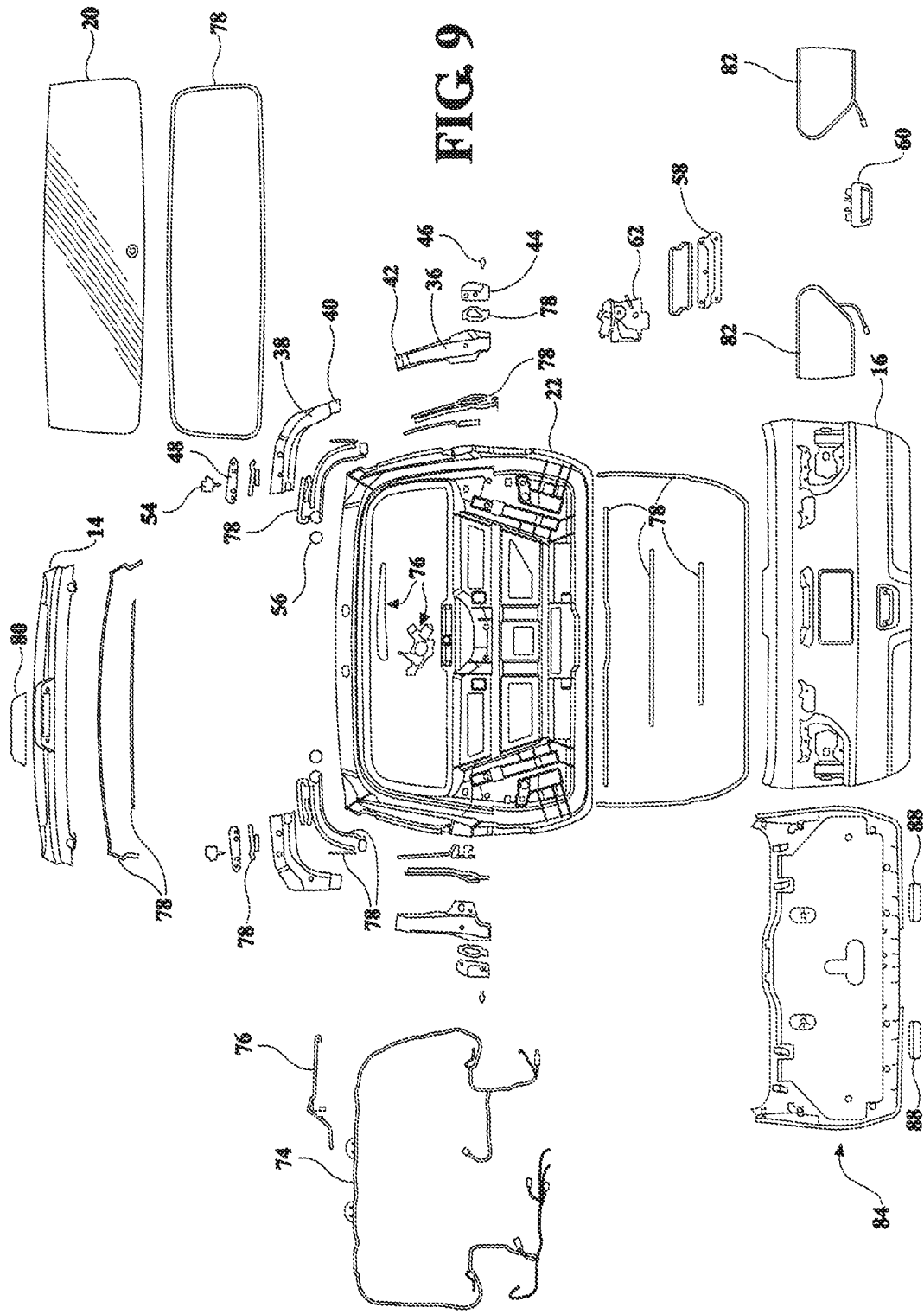

COMPOSITE LIFTGATE

CROSS-REFERENCE TO RELATED APPLICATIONS

This application is a continuation of U.S. patent application Ser. No. 15/234,735, filed Aug. 11, 2016, which is a Continuation-In-Part of Application No. PCT/US2015/015413, filed Feb. 11, 2015, which claims priority to U.S. Provisional Patent Application No. 61/938,452 filed Feb. 11, 2014. The disclosures of the above applications are incorporated herein by reference.

FIELD OF THE INVENTION

The present invention relates to liftgate systems for automobiles. More specifically, to a composite liftgate and method of manufacture.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis. Sport utility and crossover vehicles remain popular and typically include fairly heavy rear liftgates making this part of the vehicle a target area for weight reduction. Liftgates are traditionally made from stamped steel panels that are heavy and have a high tooling cost. Traditional steel liftgates are expensive investments, heavy, take up a lot of OEM floor space in areas from stamping plant, body shop, paint shop, and trim line. Further, steel liftgates have limited styling flexibility, take a lot of time to tool, and have corrosion concerns. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal components. Thermoplastic composite type materials used for liftgate applications also have difficulty meeting customer performance specifications.

Another concern with the manufacture of liftgates is that typical liftgates are manufactured as a relatively flat or smoothly contoured panel, with structural reinforcements such as ribs added onto the panel. This will also add weight and increase manufacturing complexity as well and when thermoplastics are used there are read through areas where the ribs are placed which must be dealt with by design modifications or expensive processes such as gas assist injection molding. Ribs are also weaker and do not carry the load through the liftgate panel. Recently magnesium inner reinforcement panels have been used with an outer polymer skin in order to reduce weight. While such panels are an improvement in weight, this is an expensive solution. Another concern with typical liftgates is that the structural reinforcements are steel or larger steel structures adding weight and increased manufacturing complexity. Another concern is typically reinforcement material is used for reinforcement in the structural areas and attachment structures are fixed using bolts. However, the use of bolts does not provide a continuous attachment structure and improved strength since there is distance between the bolts. Yet another concern with the manufacture of liftgates is that typical liftgates are manufactured as relatively solid with no access features such as access doors added into the panel to allow for easy access for general maintenance and repair of built in components.

A known 2008 Nissan Murano composite liftgate system helped to satisfy the weight savings and the tooling cost concerns, but utilized a typical bolt in small steel reinforcement at the latch which secures one end of the liftgate to the vehicle. This does not meet the higher load requirements desired in some applications, such as the latch pull test. A known Nissan Rogue composite liftgate system utilizes a steel one-piece outer panel and steel brackets. This does not improve density, painting efficiency, hold tighter tolerances, is more expensive and complex to manufacture, and adds weight to the liftgate/vehicle.

Accordingly, there exists a need for a composite liftgate which is both lightweight, as well as structurally sound enough to meet various load requirements, while being more mass and cost effective.

SUMMARY OF THE INVENTION

In accordance with the present invention, there is provided a composite liftgate system with inner panel construction including at least one strengthening channel structure and at least one reinforcement connected to the inner panel. The reinforcement is structural composite preform reinforcement bonded to the inner panel. The structural composite reinforcements are woven glass reinforcement. Tapping plates are minimized in size to minimize the use of steel. The present inventive provides extra strength when compared to steel or conventional composite liftgates while reducing overall weight by several pounds.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is an exploded elevation view of the composite liftgate system, in accordance with the present invention;

DETAILED DESCRIPTION OF THE PREFERRED EMBODIMENTS

Figure 1:
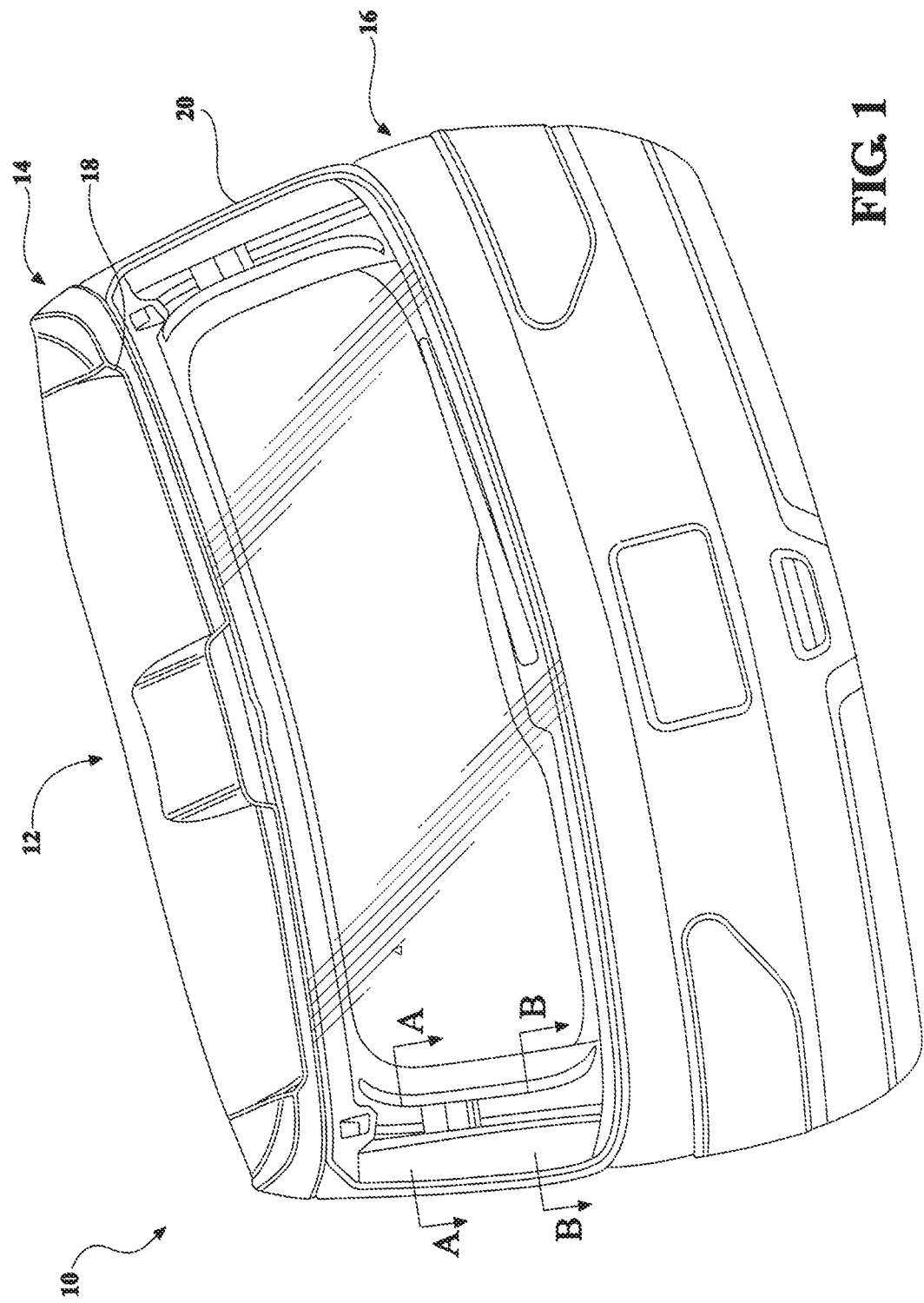
FIG. 1 is a front perspective view of a composite liftgate assembly with D-pillars removed to depict the inner structure including struts, in accordance with the present invention.

The following description of the preferred embodiment(s) is merely exemplary in nature and is in no way intended to limit the invention, its application, or uses.

Referring to the figures generally, there is provided a composite liftgate assembly with bonded composite preform reinforcements. Structural channels molded into an inner panel of the liftgate add structure where needed and manage the main loading paths as the liftgate is utilized in the various load cases. Also composite preforms structurally bonded in place (or Insert molded) to add structure where needed are used, allowing for the need for no steel reinforcements and/or minimization of the size of steel tapping plates. Bonding through the use of adhesive provides a more continuous attachment structure and improved strength over bolting alone. A two-piece outer panel allows for styling, molding, painting, tolerance, weight, and assembly advantages. The features and process of the present invention help to achieve desired weight targets, while keeping costs at target levels. In addition, the composite liftgate has several business case advantages for supplying a module, and reducing assembly plant complexity and improving throughput. Additionally, the present invention improves styling options and flexibility when compared to sheet metal and one-piece panels. Corrosion and durability are also improved.

An embodiment of a composite liftgate system is shown in the Figures generally at 10. The liftgate 10 includes an outer panel 12 formed of an upper outer panel, shown generally at 14, and a lower outer panel, shown generally at 16. A spoiler 18 is incorporated into the upper outer panel 14. A glass window 20 or rear window liftgate of the tailgate 10 is adhered to the upper and lower outer panels 14,16 and to an inner panel. The upper outer panel 14 and separate lower panel 16 thereby form a two-piece outer panel. This has significant benefits and superior results over having a one-piece panel (especially over one that is also steel or not bonded in place), including, but not limited to, improved density, more efficient painting, tighter tolerances, less manufacturing issues, and more cost effectiveness. Alternatively, the outer panel 12 may be formed as a single piece.

The spoiler 18 incorporated with the upper outer panel 14 has significant benefits and superior results over having a separate spoiler, including, but not limited to, optimized structure and strength and efficient processing.

The inner panel 22 is formed with a channel pattern arrangement including a plurality of structural channels molded into the inner panel 22 to manage the loading paths as the liftgate is utilized in various load cases. The channel pattern of the present invention provides more structural shape where needed and allows for carrying the full thickness and load through the part, whereas ribbing is weaker and will not carry the load. The channels have significant benefits and superior results over ribbing. The channels will now be explained in greater detail.

Figure 2:
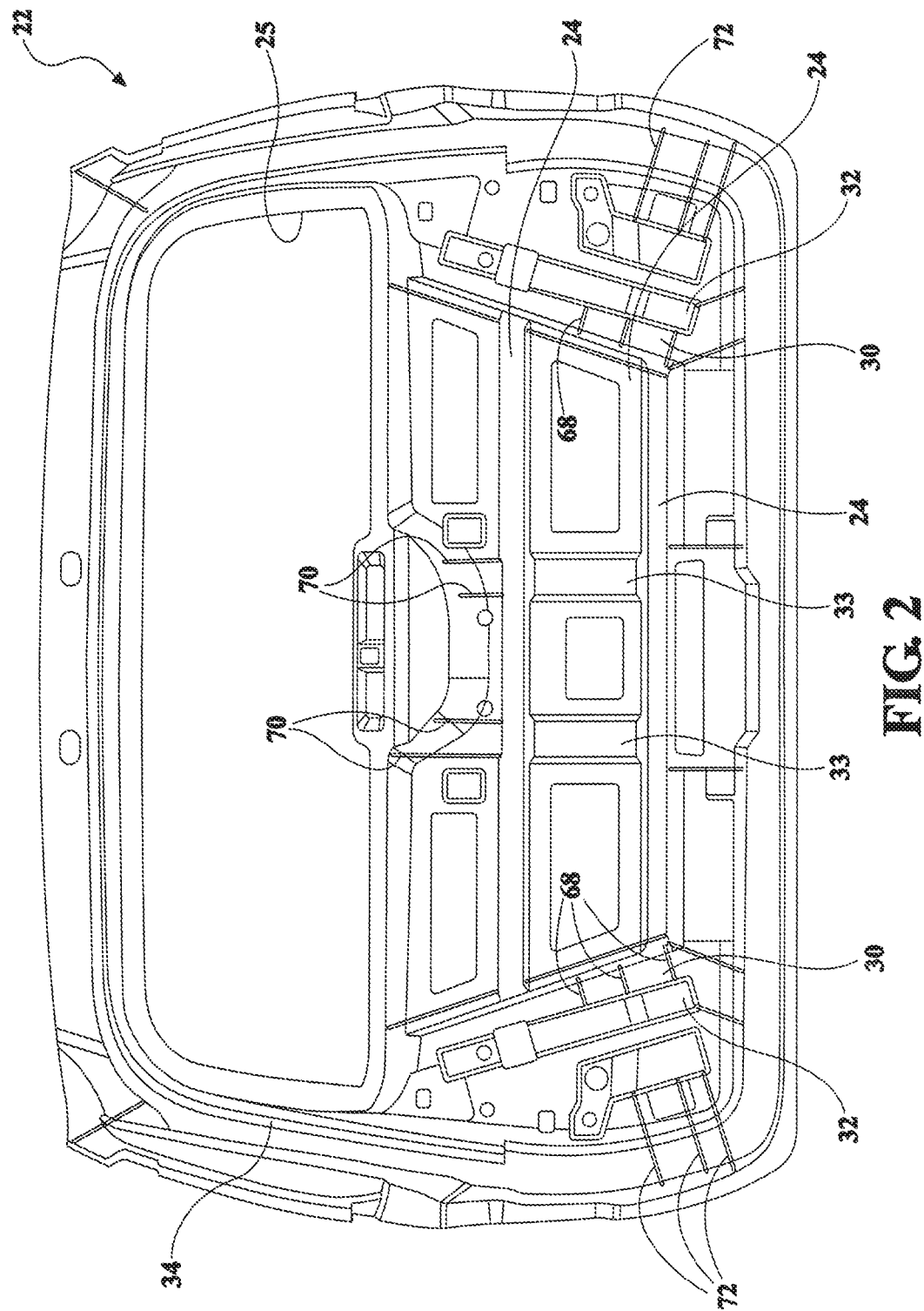
FIG. 2 is a front elevation view of an inner panel sub-assembly for the liftgate system, in accordance with the present invention.
Figure 3:
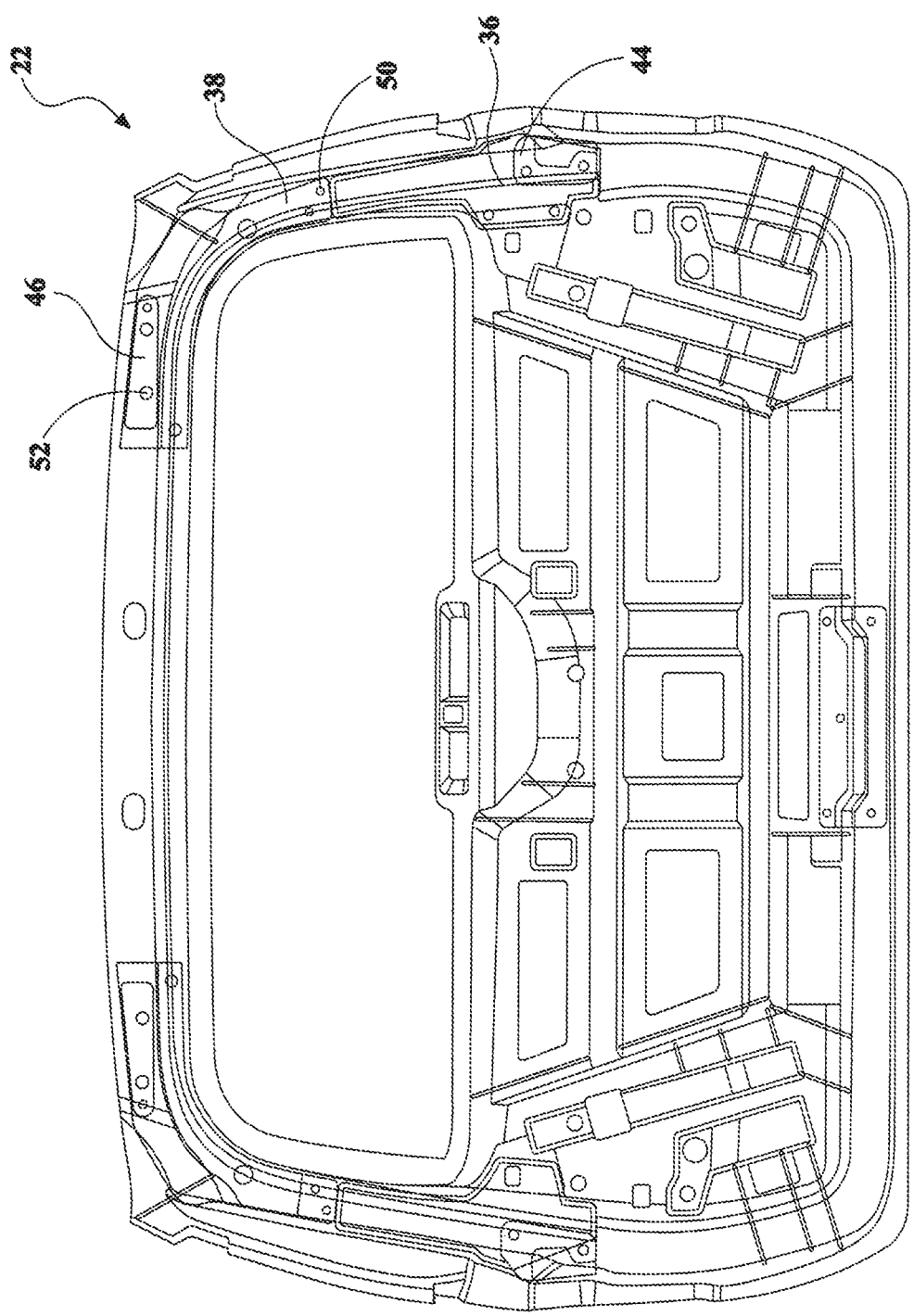
FIG. 3 is a front elevation view of the inner panel with a strut reinforcement bracket connected to a strut preform reinforcement, hinge reinforcement bracket, connected to a hinge preform reinforcement, and structural channel reinforcements in accordance with the present invention.

Molded into the inner panel 22 are at least one first pair of channels 24 that run horizontally, substantially parallel to and below a horizontal plane of the viewing opening 25 formed in the inner panel 22. The channels of the first pair 24 are substantially centrally located in the portion of the inner panel 22 below the opening 25 and an upper first pair channel 26 is longer than a lower first pair channel 28. The first pair of channels 24 are raised, as in substantially extending outward generally toward the rear of the vehicle (See FIGS. 2 and 6).

The first pair of channels 24 terminate at a second pair of channels 30 that run in a diagonal pattern at a predetermined angle, substantially in diagonal directions away from each other with the largest distance apart being toward the opening 25. The second pair of channels 30 are depressed, as in substantially extending inward generally toward the interior of the vehicle (See FIGS. 2 and 6).

A third pair of channels 32 extend substantially along each side of the second pair of channels 30 on the side away from the center of the inner panel 22. The third pair of channels 32 are raised, as in substantially extending outward generally toward the rear of the vehicle (See FIGS. 2 and 6). Preferably, the second pair of channels 30 and fourth pair of channels 32 have one side wall longer than the other side wall, sharing the common of the longer wall.

Each of the channels in the second pair of channels 30 is substantially a mirror image of the other channel of the pair 30. Each of the channels in the third pair of channels 32 is substantially a mirror image of the other channel of the pair 32.

A fourth pair of channels 33 run substantially vertically from the lower first pair channel 28 to the upper first pair channel 26 of the first pair of channels 24. The fourth pair of channels 33 are depressed, as in substantially extending inward generally toward the interior of the vehicle (See FIGS. 2 and 6).

Each of the pairs of channels 24 and 30-33 have predetermined lengths, widths, depths, and material thickness suitable to provide structural support and strength for the inner panel 22, including under predetermined load conditions. Optionally, additional channels can be formed as part of the inner panel 22.

Figure 8:
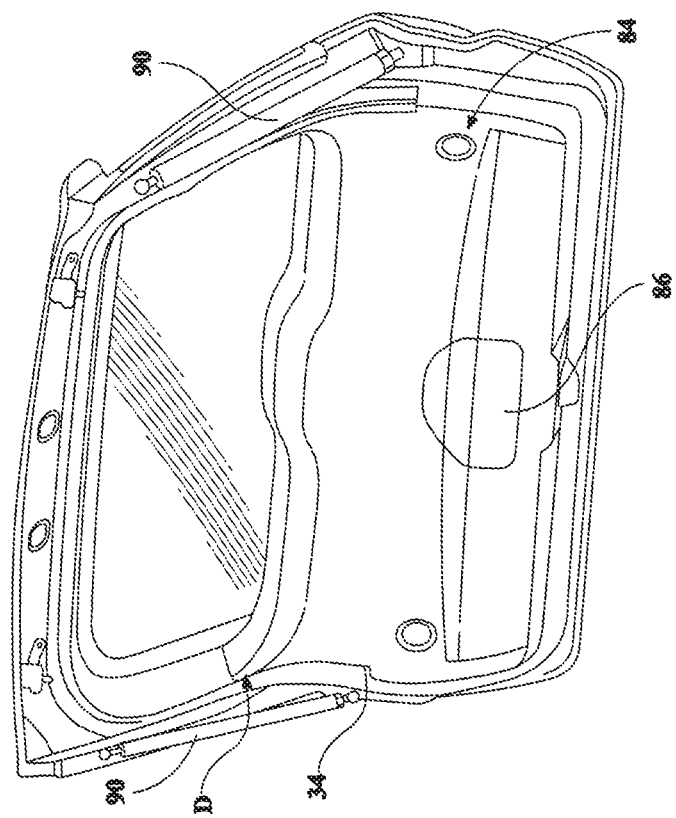
FIG. 8 is a rear perspective view of a lower trim panel connected to the inner panel for the composite liftgate assembly, in accordance with the present invention.
Figure 7:
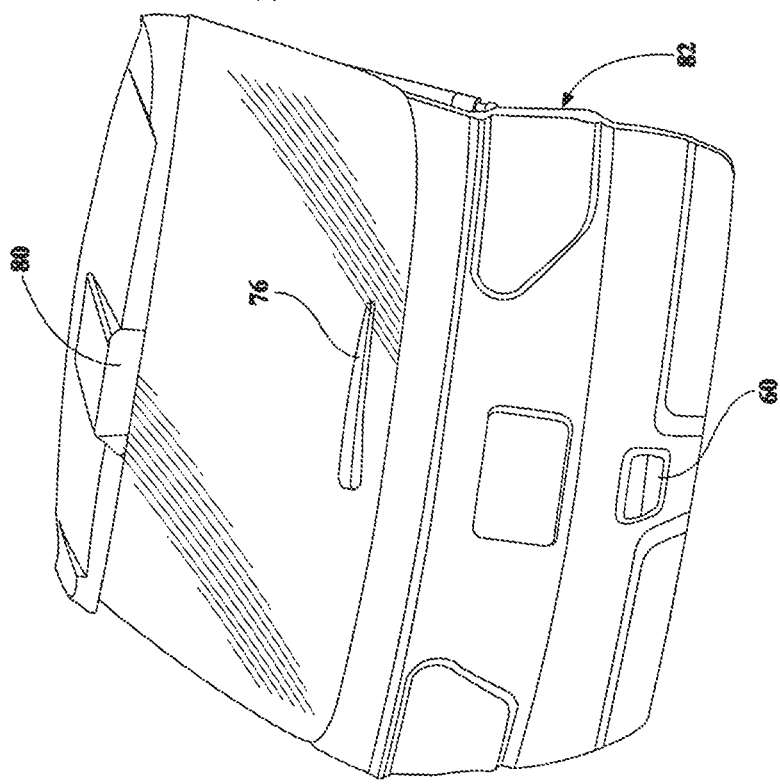
FIG. 7 is a front perspective view of the composite liftgate assembly of FIG. 1.

Formed as part of the inner panel 22 is an upper trim ring portion, generally shown at 34, incorporated into a D-pillar area ('D' FIG. 8) rather than providing the upper trim ring as a separate panel. The upper trim ring 34 incorporated into the inner panel 22 in the D-pillar area has significant benefits and superior results over having a separate panel, including, but not limited to, optimized structure and strength. The upper trim ring portion 34 has a predetermined size that is small suitable for access, e.g., for a lower trim panel installation and retention.

The liftgate 10 is additionally reinforced in areas where extra structure is needed. There is provided a plurality of composite preforms or composite reinforcements to add structure where needed to reinforce areas such as the D-pillar, top corners of the inner panel 22 at the hinge nuts, side nuts, backlight, and/or latch areas, as will be described further below. Composite preforms have significant benefits and superior results over steel reinforcements, which steel, among other things, adds weight.

All of the composite reinforcements are bonded directly to the inner panel 22 such that the composite reinforcements are structurally bonded in place (or, alternatively, insert molded to connect the reinforcements to the inner panel 22)

to add structure where needed. This allows for the elimination of steel reinforcements and to minimize the size of a plurality of tapping plates made of metal. The bonding of the present invention uses predetermined adhesive(s) applied to select the areas of the inner panel 22. Most preferably, the adhesive is a structural two-part urethane adhesive. The bonding with the use of adhesives has significant benefits and superior results over steel reinforcements connected to the inner panel by bolts. Tapping plates that are formed of steel are minimized in size and are not only bolted in place—but additionally bonded with adhesive for added strength and structure, as will be described further below. This has significant benefits and superior results over the conventional need for larger steel tapping plates that are merely bolted.

One of the composite preforms connected to the inner panel 22 is a pair of strut reinforcements 36 or strut preforms. The pair of strut reinforcements 36 are bonded to the inner panel 22 using adhesive. These are located generally in the area adjacent to the lower corner of the opening 25.

A pair of strut reinforcement brackets 44 or tapping plates, preferably formed of steel, are bonded to the pair of strut reinforcements 36 using adhesive. A first plurality of fasteners 46, e.g., push nuts, are added to further hold the strut reinforcements 36 and strut reinforcement brackets 44 in position.

Another one of the composite preforms connected to the inner panel 22 is a pair of hinge reinforcements 38 or hinge preforms. These are located generally in the area adjacent to the upper corner of the opening 25. The pair of hinge reinforcements 38 are bonded to the inner panel 22 using adhesive. A second plurality of fasteners 50, e.g., push nuts, are added to further hold the hinge reinforcements 38 in position. The lower end portion 40 of each hinge reinforcement 38 overlaps an upper end portion 42 (FIG. 9) of each strut reinforcement 36. Preferably, this upper end portion 42 has a lower profile for connecting to the inner panel 22 below the lower end portion 40 of hinge reinforcement 38 and provide a butting engagement with the hinge reinforcement 38. Most preferably, the lower end portion 40 is bonded to the upper end portion 42 with adhesive.

A pair of hinge reinforcement brackets 48 or tapping plates, preferably formed of steel, are bonded to the pair of hinge reinforcements 38 using adhesive. A third plurality of fasteners 52, e.g., screws, are added to further hold the hinge reinforcements 38 and hinge reinforcement brackets 48 in position.

Each hinge reinforcement bracket 48 also has a hinge assembly 54 coupled thereto. Each hinge reinforcement 38 and strut reinforcement 36 also has at least one compression limiter 56 coupled thereto. At least one compression limiter 56 is coupled near the bottom rear edge of the inner panel 22.

A latch reinforcement bracket 58 or tapping plate, preferably formed of steel, is bonded to the inner panel 22 using adhesive in the area where a latch handle 60 is connected to the lower outer panel 16. Optionally, a fourth plurality of fasteners, e.g., screws, are added to further hold the latch reinforcement bracket 58 in position. The latch handle 60 actuates a latch manual and/or power liftgate device 62 coupled to the inner panel 22 generally adjacent to the latch reinforcement bracket 58 when engaged by an operator of the liftgate 10.

Figure 6:
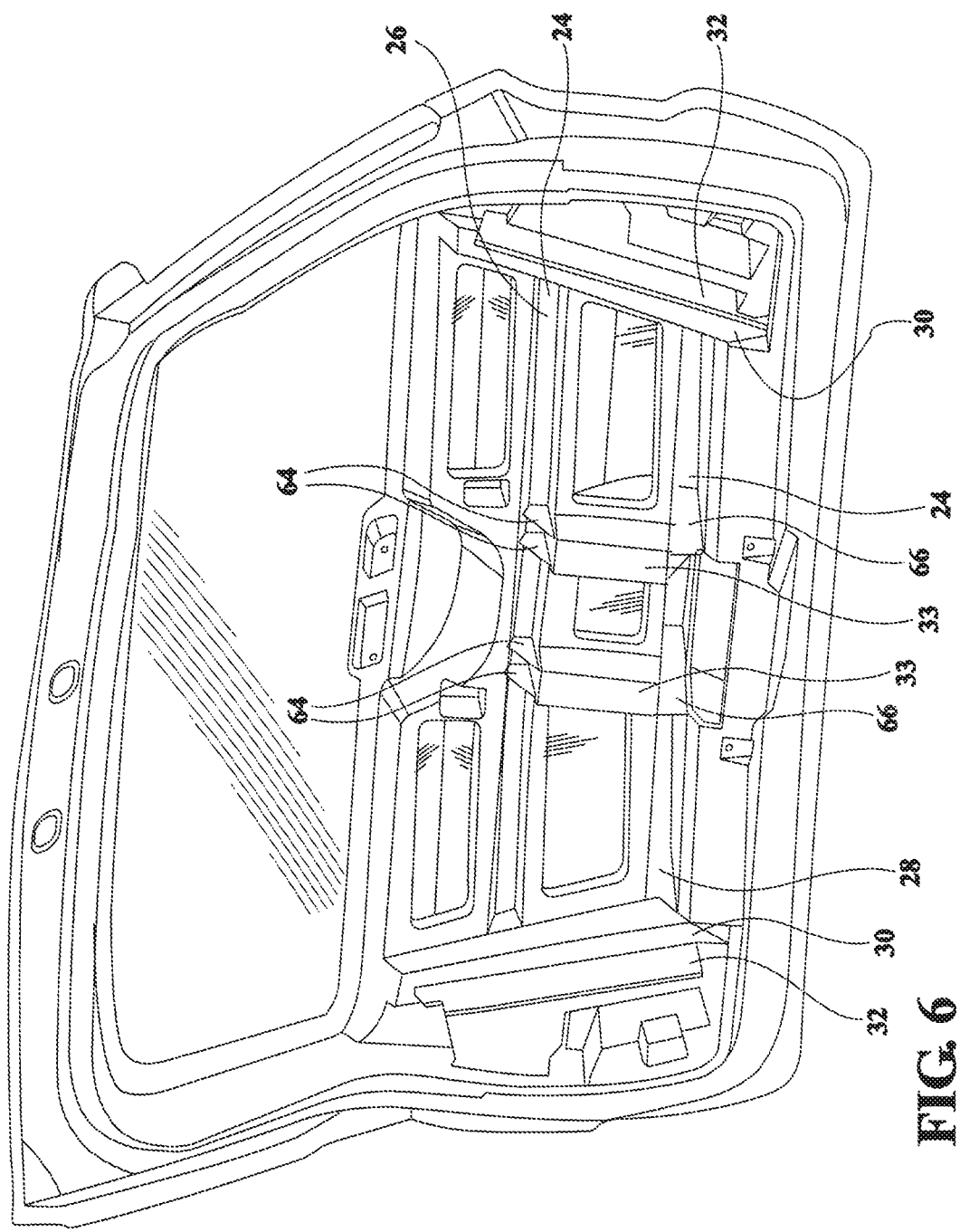
FIG. 6 is a rear perspective view depicting the inner panel sub-assembly for the liftgate system, in accordance with the present invention.

Formed as part of the inner panel 22 are additional structural reinforcements such as ribs and fins. A set of sloped fin-like shaped 64 ridges are each connected to a top surface of both channels of the fourth pair of channels 33 and within the upper first pair channel 26 (FIG. 6). At least one pair of first ribs 66 are connected to a bottom surface of the fourth pair of channels 33. A plurality of second ribs 68, e.g., at least three ribs, are connected within each of the second pair of channels 30. A plurality of third ribs 70, e.g., two pairs of two ribs, are connected to a top surface of the upper first pair channel 26 and run generally vertically to a predetermined distance below the opening 25. A plurality of fourth rips 72, e.g., at least three ribs, run substantially diagonal across the lower inside corner areas of the inner panel 22. Each fin or rib in the respective sets and pairs are substantially parallel with one another.

Each fin or rib in the respective sets and pairs have predetermined lengths, widths, depths, and material thickness suitable to provide structural support and strength for the inner panel 22 and improve the rigidity of the liftgate 10 system, including under predetermined load conditions. Optionally, additional fins and/or ribs can be formed as part of the inner panel 22.

Figure 4:
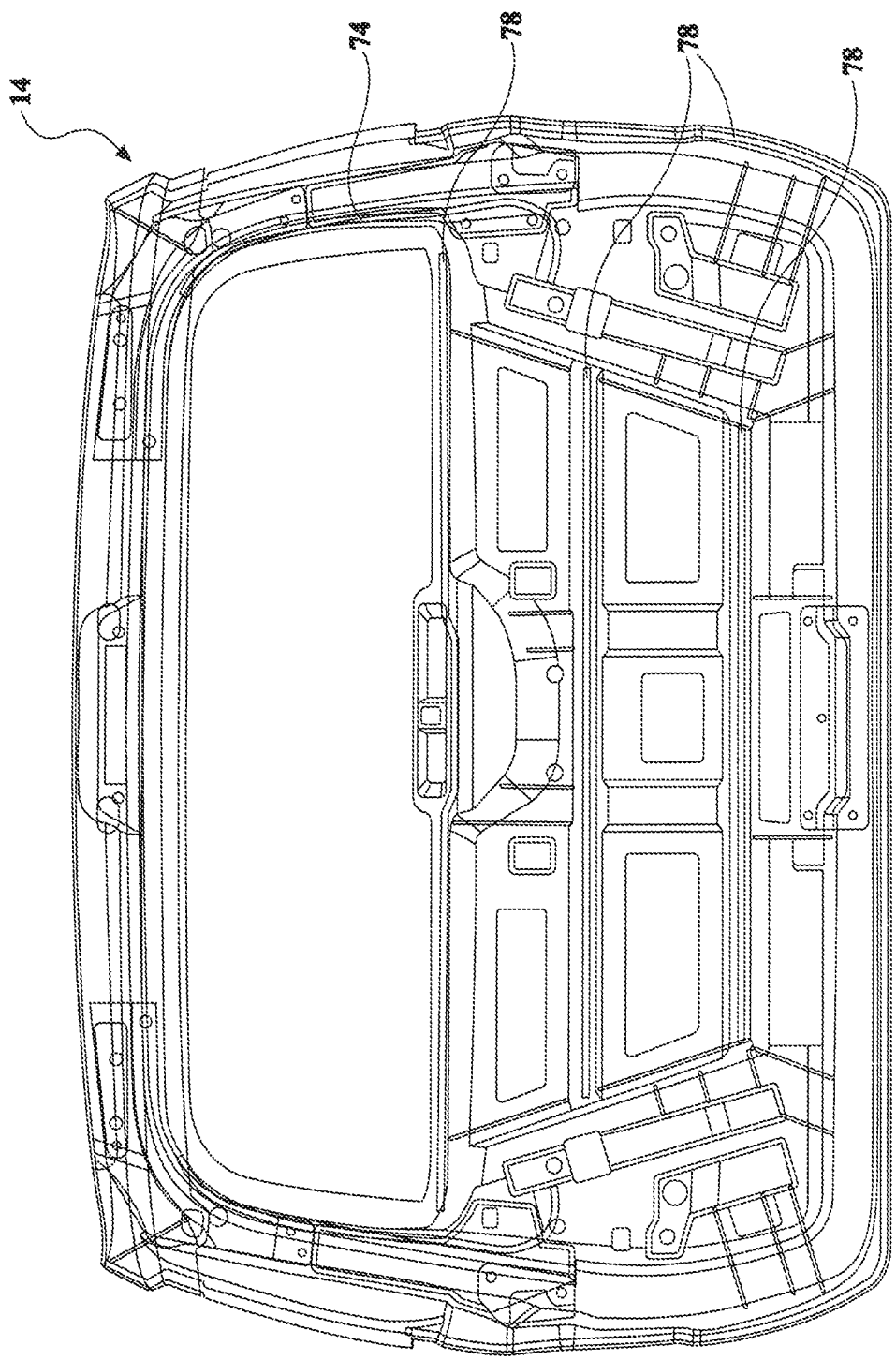
FIG. 4 is a front elevation view of an upper outer panel connected to the inner panel, in accordance with the present invention.
Figure 5:
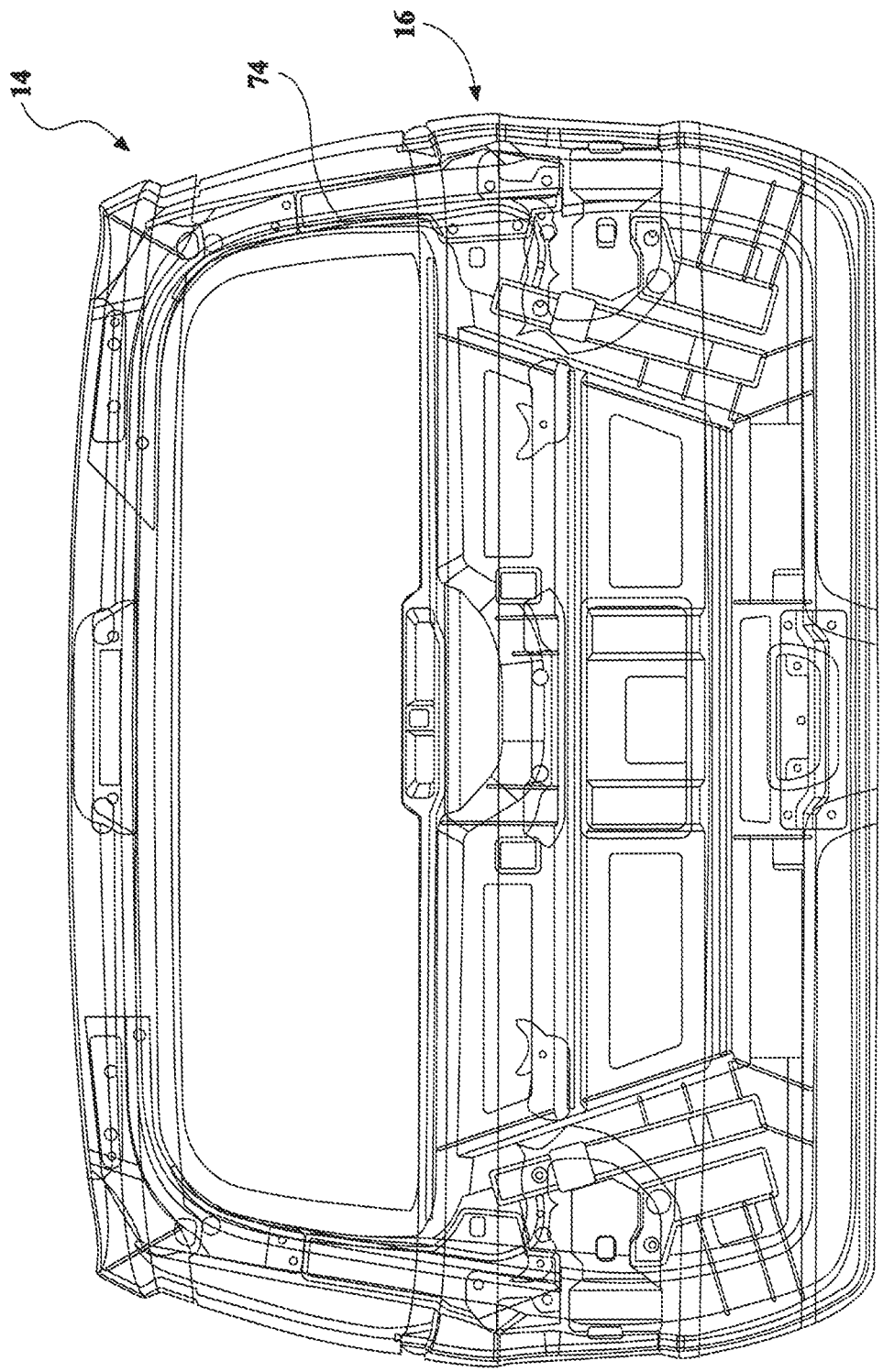
FIG. 5 is a front elevation view of the upper outer panel and a lower outer panel connected to the inner panel, in accordance with the present invention.

There is provided a main wiring harness 74 and a washer device 76 with a motor and wider coupled to the inner panel 22. The outer panel 12 is bonded to the inner panel 22 by using adhesive 78 ("78" indicates adhesive for various components, e.g., FIGS. 4 and 9) applied in a predetermined pattern and locations on the inner panel 22. Also provided is a center high-mount stop light (CHMSL) device 80 connected to the upper outer panel 14. A tail light assembly 82 is operably connected to the lower outer panel 16. Preferably, the tail light assembly 82 is bonded to the lower outer panel 16 with adhesive and additionally a plurality of fasteners.

Figure 10:
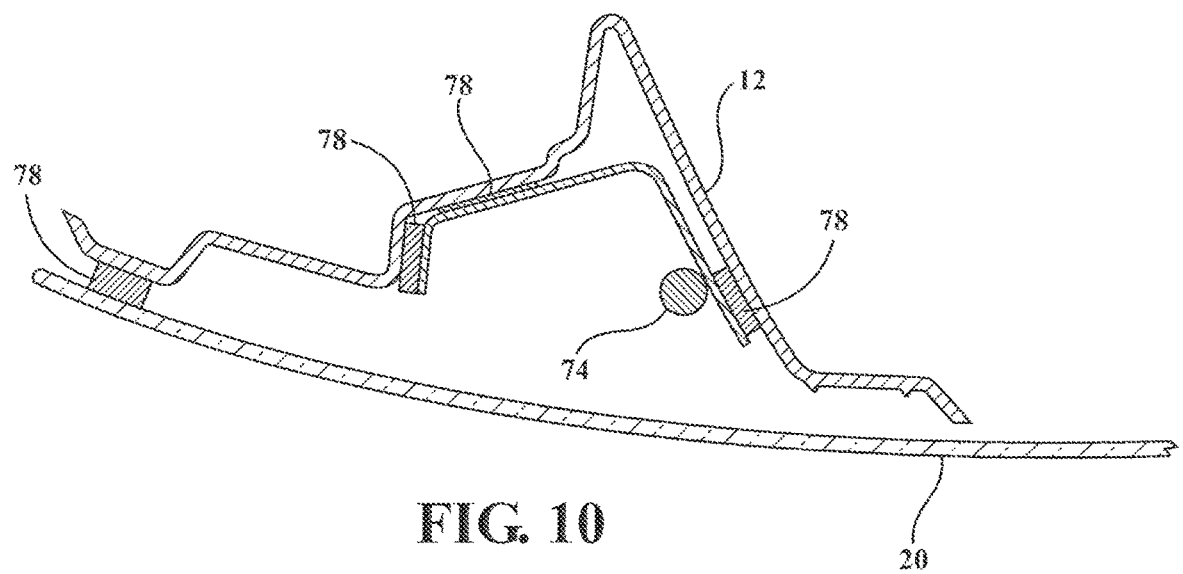
FIG. 10 is a sectional view taken alone section A-A of FIG. 1.
Figure 11:
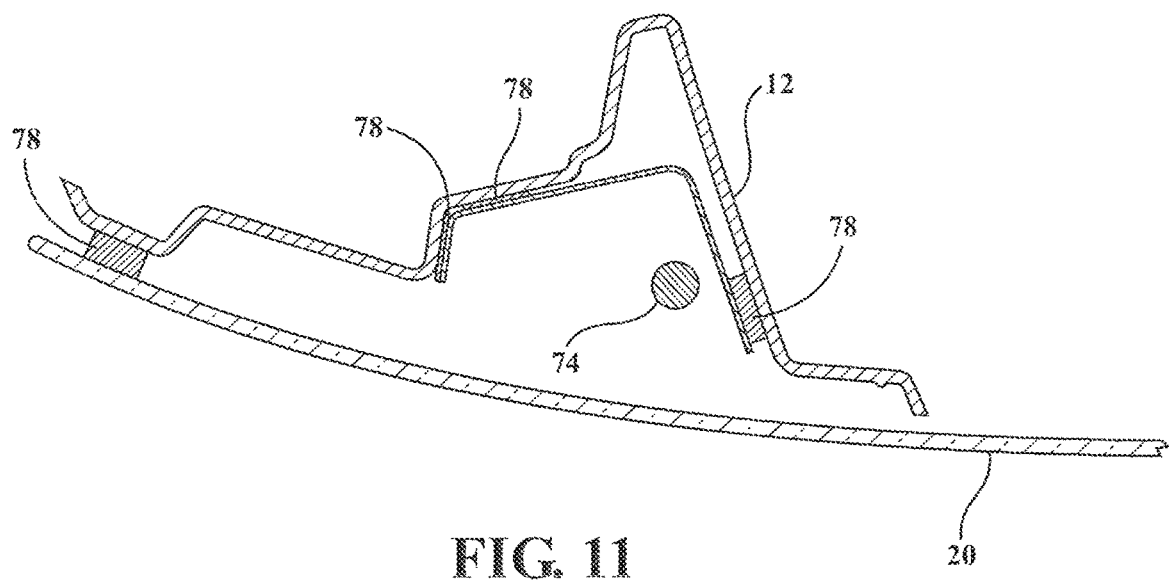
FIG. 11 is a sectional view taken alone section B-B of FIG. 1.

As further illustrated in FIG. 10, the inner panel 22 is bonded to the glass panel 20 and reinforcement brackets, e.g., each strut reinforcement bracket 44, through the use of adhesive 78 such that packaging for wiring, e.g., the main wiring harness 74, and an adjacent gas strut is provided. The reinforcement has a predetermined thickness and is bonded, rather than merely bolting in a few locations, with structural adhesive to bond in place with continuous attachment of the structure. The inner panel connected to the brackets and outer panel forms predetermined operable cross sections.

Also connected to the inner panel 22 is a lower trim panel, shown generally at 84, substantially facing toward the vehicle interior and running generally from the D-pillar to near the bottom edge of the inner panel 22. The lower trim panel has class A surfaces and at least one access panel 86 or door. A pair of handle pockets 88 is also provided in the lower trim panel 84 for an operator to selectively grasp when operating the liftgate 22, in particular to cycle to the liftgate 10 from an open to a closed position.

The access door 86 is removable and/or rotatable for gaining access to at least the latch mechanism assembly 62 for maintenance and/or repair. The access panel 86 is a significant benefit over conventional liftgates requiring disassembly and maintenance/repair complexity. Preferably, there are at least five access panels 86 suitably situated where maintenance and repair of various components not otherwise easily accessible is desired. Most preferably, at least one access panel 86 is located in each of the following areas: the latch mechanism assembly 62, tail light assembly 82 (e.g., for changing both burnt out tail lights), CHMSL 80, and wiper device 76 (e.g., to access a wiper motor) areas.

A pair of gas struts 90 is operably connected to the inner panel 22 and/or a hinge system. The gas strut and hinge system are connected to the vehicle.

By non-limiting example, the inner panel 22 is bonded to the outer panel 12 to using urethane bonding. The inner panel 22 provides structural support for the composite liftgate of the present invention not only through the shape of the inner panel as described above, but the material used to make the inner panel provides structural support as well. The inner panel 22 is made of a structural thermoplastic, such as a polypropylene, a thermoset or thermoplastic such as a reinforced polypropylene (RPP), and is preferably a 40% glass-filled polypropylene. The inner panel 22 is preferably thermoplastic 0.5 inch long glass filament filled polypropylene. By way of non-limiting example, the outer panel 12 is made of a suitable thermoplastic used as a show surface, such as a thermoplastic polyolefin (TPO). The structural composite reinforcements preferably comprise woven glass reinforcement.

The inner panel 22 is preferably thermoplastic injection molded with mold-in color, and grain in areas of class A surface(s). Thereafter, the inner panel 22 is painted and bonded with the structural composite reinforcements. Alternatively, the structural composite reinforcements are insert molded to connect the reinforcements to the inner panel 22. At least the hitch reinforcement brackets are additionally affixed with fasteners. The reinforcement brackets are bonded in place and further held in position with fasteners. Bonding is substantially beneficial over conventional liftgates. The outer panel 12 is painted prior to connecting to the inner panel 22. The outer panel 12 is bonded to the inner panel 22 and the glass pane 20 is bonded to the inner panel 22 and outer panel 12 (fasteners are additionally contemplated in addition to the adhesive). The lower trim panel 84 is operably connected to the inner panel 22 by at least adhesive.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite liftgate system, comprising:
    an inner panel;
    a plurality of structural channels molded into the inner panel to manage loading paths applied to the inner panel; and
    a plurality of composite preforms operable to connect to the inner panel to add structure and strength where needed in predetermined locations;
    wherein the plurality of structural channels comprise:
        a first pair of channels extending horizontally below an opening for a rear liftgate window formed in the inner panel;
        a second pair of channels extending substantially in diagonal directions away from each other with the largest distance apart being toward the opening;
        a third pair of channels extending substantially along a side of each channel of the second pair of channels; and
        a fourth pair of channels extending substantially vertically between the first pair of channels.

2. The composite liftgate system of claim 1, wherein the plurality of composite preforms are connected to the inner panel through the use of insert molding.

3. The composite liftgate system of claim 1, further comprising an outer panel operable for being connected to the inner panel.

4. The composite liftgate system of claim 3, wherein the outer panel is two separate pieces comprised of an upper outer panel connected to the inner panel and a lower outer panel connected to the inner panel.

5. The composite liftgate system of claim 4, wherein a spoiler is incorporated with the upper outer panel.

6. The composite liftgate system of claim 3, wherein the plurality of composite preforms and/or outer panel are connected to the inner panel through the use of structural adhesive.

7. The composite liftgate system of claim 1, wherein the first pair of channels is comprised of an upper first pair channel and a lower first pair channel that is shorter than the upper first pair channel, the first pair of channels extending between and terminating at the second pair of channels.

8. The composite liftgate system of claim 1, wherein each channel of the third pair of channels extend along a respective one of the second pair of channels on the outward side away from a center of the inner panel.

9. The composite liftgate system of claim 1, wherein the first pair of channels and third pair of channels are raised, generally toward the rear of a vehicle, and wherein the second pair of channels and fourth pair of channels are depressed, generally toward the interior of the vehicle.

10. The composite liftgate system of claim 1, further comprising a plurality of additional structural reinforcements, at least a portion of the additional structural reinforcements disposed in at least the first pair of channels and second pair of channels.

11. The composite liftgate system of claim 10, wherein said plurality of additional structural reinforcements comprise a plurality of ribs.

12. The composite liftgate system of claim 1, wherein the plurality of composite preforms comprise:
    a pair of strut reinforcements connected to the inner panel substantially near D-pillar areas; and
    a pair of hinge reinforcements connected near upper corners of the inner panel.

13. The composite liftgate system of claim 12, further comprising a plurality of reinforcement brackets operable to connect to the plurality of composite preforms, the plurality of reinforcement brackets comprising:
    a pair of strut reinforcement brackets adhered to the pair of strut reinforcements; and
    a pair of hinge reinforcement brackets adhered to the pair of hinge reinforcements.

14. The composite liftgate system of claim 13, wherein each upward end of the pair of strut reinforcements and each lower end of the pair of hinge reinforcements are additionally adhered to one another.

15. The composite liftgate system of claim 13, further comprising a plurality of fasteners applied to at least the pair of hinge reinforcements, the pair of strut reinforcement brackets, and the pair of hinge reinforcement brackets, the fasteners further holding at least the pair of hinge reinforcements, pair of strut reinforcement brackets, and pair of hinge reinforcement brackets in position in combination with a structural adhesive.

16. The composite liftgate system of claim 1, further comprising a lower trim panel operable to connect to the inner panel and having a class A show surface.

17. The composite liftgate system of claim 16, wherein the lower trim panel has at least one access panel.

18. The composite liftgate system of claim 1, wherein the plurality of composite preforms comprise woven glass reinforcement and/or the inner panel comprises thermoplastic 0.5 inch long glass filament filled polypropylene.

19. The composite liftgate system of claim 1, further comprising an upper trim ring incorporated into the inner panel providing at least a portion of D-pillar trim.

20. A composite liftgate system, comprising:
an outer panel;
a lower trim panel;
an inner panel formed of a composite material; where the outer panel and lower trim panel are coupled to the inner panel;
a plurality of structural channels molded into the inner panel to manage loading paths applied to the inner panel;
a plurality of composite preforms operable to connect to the inner panel to add structure in at least a strut and upper corner area of the inner panel; and
a plurality of reinforcement brackets connected to said plurality of composite preforms.

21. The composite liftgate system of claim 20, wherein the plurality of structural channels comprise:
a first pair of channels extending horizontally below an opening for a rear liftgate window formed in the inner panel;
a second pair of channels extending substantially in diagonal directions away from each other with the largest distance apart being toward the opening;
a third pair of channels extending substantially along a side of each channel of the second pair of channels; and
a fourth pair of channels extending substantially vertically between the first pair of channels.

22. The composite liftgate system of claim 20, wherein the plurality of composite preforms and/or outer panel are connected to the inner panel through the use of at least structural adhesive.

23. A composite liftgate system for a vehicle, comprising:
an inner panel that is a glass-filled polypropylene;
an outer panel having an upper outer panel and a lower outer panel connected to the inner panel;
a lower trim panel connected to the inner panel;
a plurality of structural channels formed in the inner panel to manage loading paths applied to the inner panel;
a plurality of composite preforms connected to the inner panel to add structure in at least a strut and upper corner area of the inner panel, where at least a portion of the plurality of composite preforms are additionally connected to one another;
a plurality of reinforcement brackets connected to said plurality of composite preforms; and
a plurality of additional structural reinforcements located in at least a portion of the plurality of structural channels;
wherein at least a portion of the plurality of composite preforms, plurality of reinforcement brackets and/or outer panel are connected to the inner panel through the use of at least structural adhesive.

24. The composite liftgate system of claim 23, wherein the plurality of structural channels comprise:
a first pair of channels extending horizontally below an opening for a rear liftgate window formed in the inner panel;
a second pair of channels extending substantially in diagonal directions away from each other with the largest distance apart being toward the opening;
a third pair of channels extending substantially along a side of each channel of the second pair of channels; and
a fourth pair of channels extending substantially vertically between the first pair of channels.

25. The composite liftgate system of claim 23, further comprising a plurality of fasteners applied to at least a portion of the plurality of composite prefroms and plurality of reinforcement brackets, where the fasteners further holding at least the plurality of composite prefroms and plurality of reinforcement brackets in position on the inner panel in combination with the structural adhesive.

* * * * *